United States Patent [19]

Salomonsen et al.

[11] Patent Number: 4,764,904
[45] Date of Patent: Aug. 16, 1988

[54] INTERACTIVE CONTOURING OF SEISMIC DATA

[75] Inventors: Per Salomonsen, Sandnes; Lars Sønneland, Tananger, both of Norway

[73] Assignee: Geophysical Company of Norway AS, Hovik, Norway

[21] Appl. No.: 776,382

[22] Filed: Sep. 17, 1985

[30] Foreign Application Priority Data

Sep. 17, 1984 [NO] Norway ................................ 843698

[51] Int. Cl.⁴ ............................................ G01V 1/00
[52] U.S. Cl. ...................................... 367/70; 367/72
[58] Field of Search ................................ 367/70–74; 340/701, 703; 346/33 C, 46

[56] References Cited

U.S. PATENT DOCUMENTS

| | | | |
|---|---|---|---|
| 3,931,609 | 1/1970 | Anstey | 367/72 |
| 4,063,216 | 12/1977 | Chapman et al. | 367/72 |
| 4,228,529 | 10/1980 | Hsu et al. | 367/70 |
| 4,467,461 | 8/1984 | Rice | 367/70 |
| 4,633,401 | 12/1986 | Flinchbough | 367/72 X |

OTHER PUBLICATIONS

Digicon Geophysical Corp. Advertisement, Geophysics, vol. 48, No. 5, 1983.

Geophysical Service Inc. Advertisement, Geophysics, vol. 48, No. 5, 1983.

*Primary Examiner*—Thomas H. Tarcza
*Assistant Examiner*—Mark Hellner
*Attorney, Agent, or Firm*—Holman & Stern

[57] ABSTRACT

A method for interactive contouring of seismic data for procuring seismic maps (60a, 60b, 60c) which provide a three-dimensional picture of the various structural layers (5a–5n, 12a–12n, respectively) within an area (11) which is circumscribed by intersecting shooting lines (6a–6d). In order to achieve a shorter processing time for procuring such maps, the data representing the individual structural layers (5a–5n) referred to a fixed reference line (2a) are procured as a color coded echo line (12h) on a graphic data screen (22), the indication of depth being given as a color value in relation to a preselected color scale (40). The interpreter can insert between the various points having the same color value on the echo line (12h) fresh interpreted values in the same grid according to the same color code, so that for each structural layer (5a–5n, 12a–12n, respectively) there can be provided a mapping (60a–60n) having surface adaptations given in various color values directly on the screen (22). The graphic display of the structural layer maps can be reproduced three-dimensionally on a color value printer (31) directly from the screen (22).

19 Claims, 6 Drawing Sheets

INTERACTIVE CONTOURING OF SEISMIC DATA

BACKGROUND OF THE INVENTION

1. Field of the Invention

The present invention relates to a method for interactive contouring of seismic data for providing a three-dimensional reproduction of various structural layers within an area defined by intersecting shooting lines.

2. Description of the Prior Art

The present invention is primarily contemplated in connection with marine seismic surveys, but it is to be understood that the method can be used for treating seismic data generally, i.e. data which are collected in connection with land seismic surveys.

However, for the sake of simplicity the present invention will be described in connection with a marine seismic system.

In connection with marine seismic surveys, there is used a seismic vessel which is sailing along specific lines in the area which is to be investigated with respect to any hydrocarbon or similar deposits or similar, a so-called hydrophone cable of several kilometers length being towed behind the vessel, as well as devices for generating sound waves which are transmitted downwardly towards the sea bed. The sound waves are reflected from the sea bed and layers therebelow and are detected by sensitive hydrophones arranged along the hydrophone cable.

The echo signals which return to the hydrophone cable are supplied to and treated in large computers on the seismic vessel, and these treated data form the basis for the production for seismic maps. The maps are used by geologists and geophysicists for the selection of places where test drilling is to be effected.

The production of the seismic maps can take place in a land based data installation and the final determination of the maps is carried out by an interpreter on the basis of so-called interpretation data which in turn refer to the data provided along the shooting lines.

SUMMARY OF THE INVENTION

The object of the present invention is to give instructions for a method for interactive contouring of seismic data, which considerably reduces the time of interpretation.

The object is achieved by a method of the type generally described above, which according to the invention is characterized in that the data representing a first selected structural layer referred to a fixed reference line, and which have been provided along the shooting lines, are plotted on a graphic data screen, the indication of depths being given as a color value in relation to a preselected color scale (scale of depth), and that between various points having the same value (depths) on the graphic screen there are inserted interpreted elevations referred to the individual color values, such that for each selected structural layer, there can be provided a mapping having elevations indicated in various color values directly on the screen, whereafter a printout of the graphic display of the structure layer map can be reproduced "three"-dimensionally on a color value printer directly from the screen.

By this method it is thus possible by means of an interactive manual contouring program to obtain three-dimensional map surfaces for each structural layer in question. In this way there is achieved a very good outline of each individual structural layer which exists inside the shooting lines along which the basic data were acquired, and by comparing the various structural layers it is possible to obtain such useful information about the geology below the sea bed or in the ground that a decision about test drilling can be made.

Thus, the method according to the invention is primarily based on an interactive manual contouring program in which the starting point is a regular grid along the lines which have been shot, the interpreted values along the shooting lines or the grid lines appearing with color code on an interactive screen. Thereafter, contours or elevations are drawn as fresh interpreted values which are inserted in the grid according to the same color codes. If fault traces are present, these will also be drawn into the grid, but then primarily with a certain value which is coded with an easily recognizable color.

The surface adaption takes place by a simple interpolation between the closest control points. This takes the fault into account as interpolation/extrapolation is effected right up to the faults without taking into account the values or control points above the faults.

BRIEF DESCRIPTION OF THE DRAWINGS

In the following the invention will be further described, reference being made to the accompanying drawing wherein.

DETAILED DESCRIPTION OF THE DRAWINGS

Figure 1:
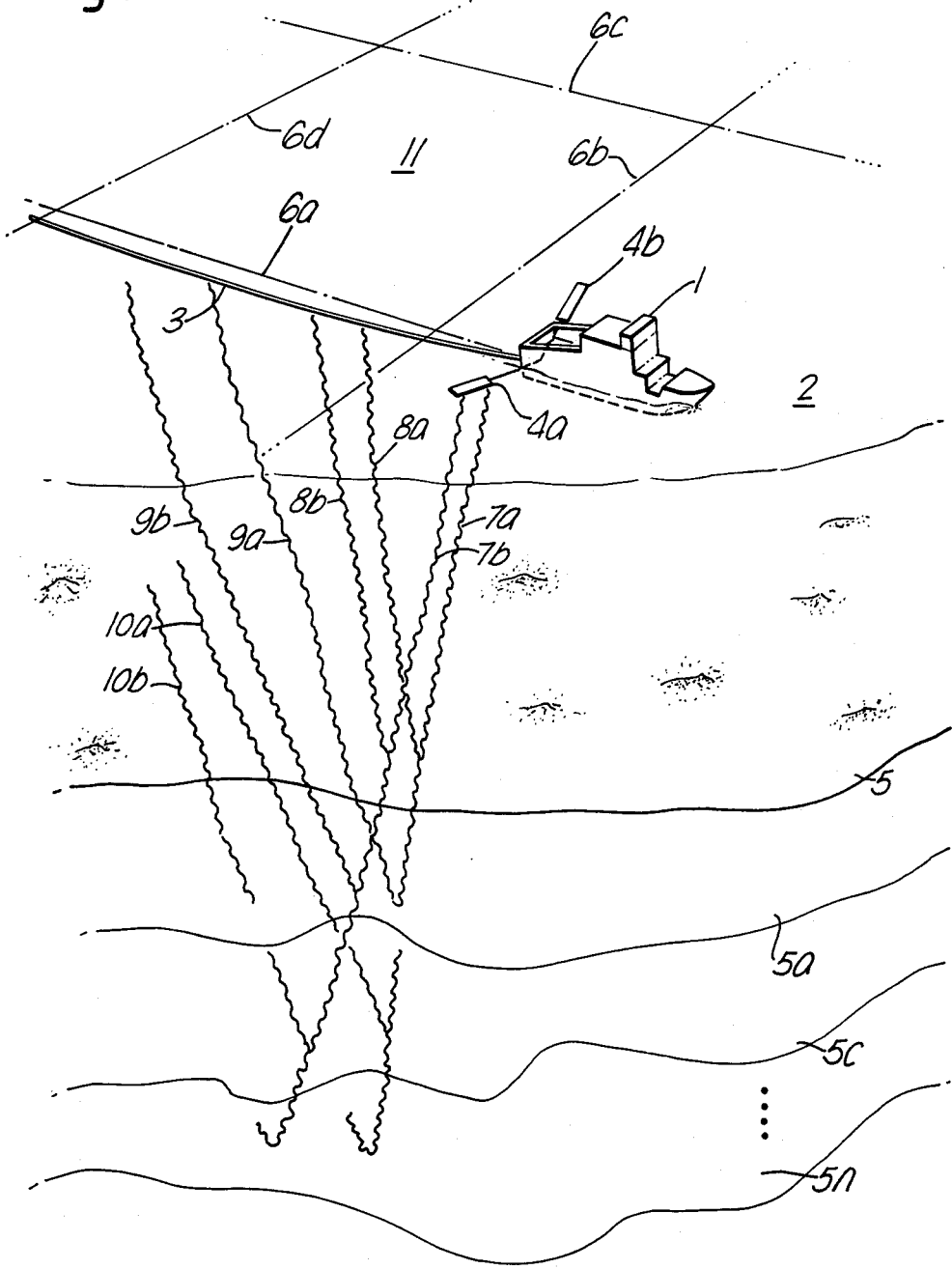
FIG. 1 is a diagrammatic perspective view partly in section, which illustrates a seismic vessel including air guns and a towed seismic cable, as well as various echo reflecting layers at and below the sea bed.

In FIG. 1 there is illustrated a seismic vessel 1 sailing on the surface 2 of the sea, said vessel towing a seismic cable 3 and a couple of groups of air guns, 4a and 4b respectively.

Further, 5 designates the sea bed whereas 5a, 5c . . . 5n designate various geological layers below the sea bed 5.

On the surface 2 of the sea there are depicted four dot-dash lines 6a, 6b, 6c and 6d respectively, indicating the heading lines or the shooting lines along which the seismic vessel 1 is sailing during the seismic operations in the area in question.

During the sailing shots are fired from the air guns 4a and 4b according to an appropriate program, so that from the guns there are transmitted sound waves which here, as an example, are illustrated by 7a and 7b. The sound waves 7a, 7b which are transmitted from the air guns 4a, 4b are reflected from the objects which are hit under the water as well as from the sea bottom 5 and the various layers 5a, 5c . . . 5n therebelow. The echo signals which return to the hydrophone cable, for example the signals 8a, 8b from the sea bottom 5 and the echo signals 9a, 9b from the geological layer 5a and the echo signals 10a, 10b from the geological layer 5c, etc., return to the seismic cable 3 in which they are detected by a serious of hydrophones (not shown) arranged along the cable.

Figure 2:
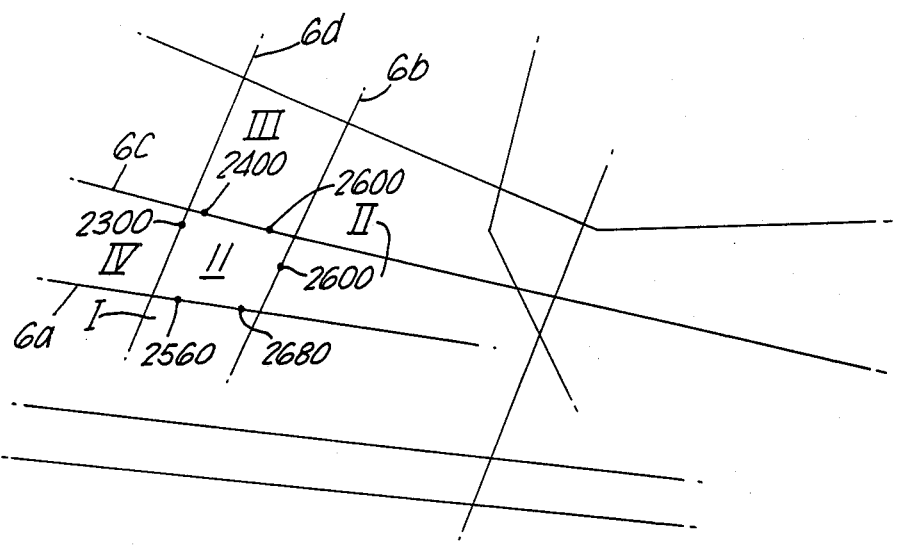
FIG. 2 is a diagrammatic view illustrating an example of heading lines or shooting lines along which the seismic vessel has sailed during an exploration of an ocean area.
Figure 3:
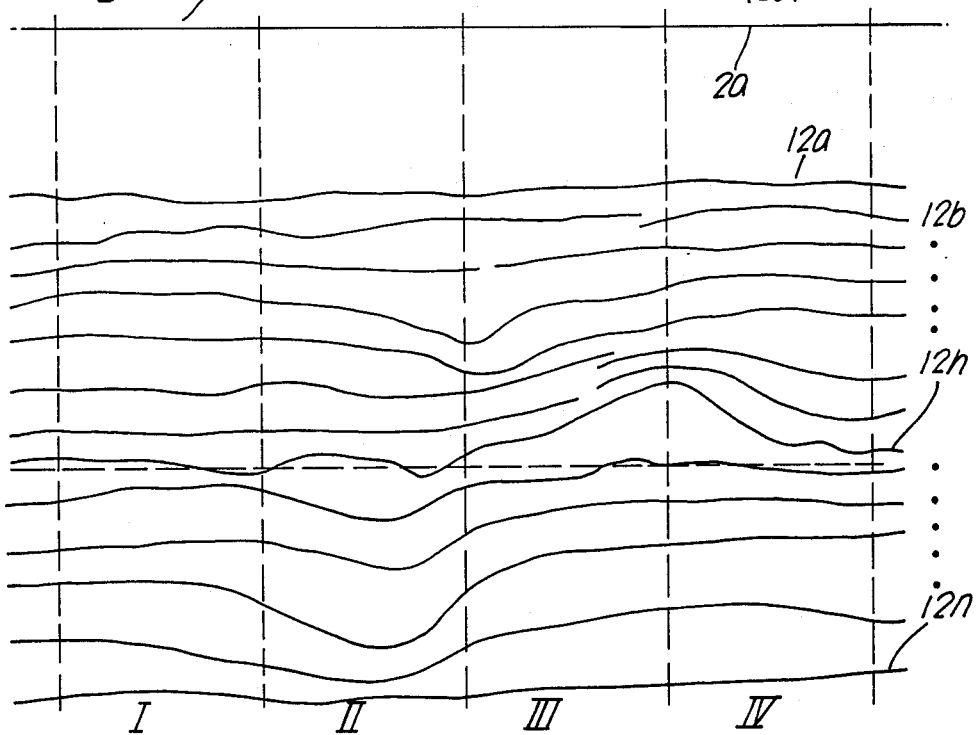
FIG. 3 is a vertical plane map illustrating echo lines developed during the treating of the seismic data which were registered along the shooting lines, the echo lines in the area of the shooting lines indicating the variations of depth of the different structural layers at and below the sea bed.

After an appropriate transformation of the echo signals, these are transferred to a data processing device on the seismic vessel, and on the basis of these treated data there can be produced a so-called shot point map, which is illustrated as an example in FIG. 2 and so-called seismic vertical sections of the type illustrated in FIG. 3.

In FIG. 2, which diagrammatically illustrates a grid of heading lines or shooting lines, the shooting lines 6a, 6b, 6c and 6d from FIG. 1 can be recognized, said lines circumscribing an area 11 for which it is desired to provide further geologial data.

In FIG. 3 there is illustrated a vertical plane section showing echo lines which here are designated by 12a, 12b, . . . 12n, and which are the result of the treatment of the seismic data registered along the indicated shooting lines 6a, 6b, 6c and 6d, the individual echo lines stating the depth variations of the various strata or structural layers at and below the sea bed.

The plane section illustrated in FIG. 3 circumscribes in reality the area 11 which is shown in FIG. 2, the plane section of FIG. 3 being divided in four plane section areas I, II, III and IV. In FIG. 2 there are included certain numeric values along the plane section areas I, II, III, IV, this circumscribing grid corresponding for example to the echo line 12h in FIG. 3, which in turn refers to 5h in FIG. 1.

Figure 4:
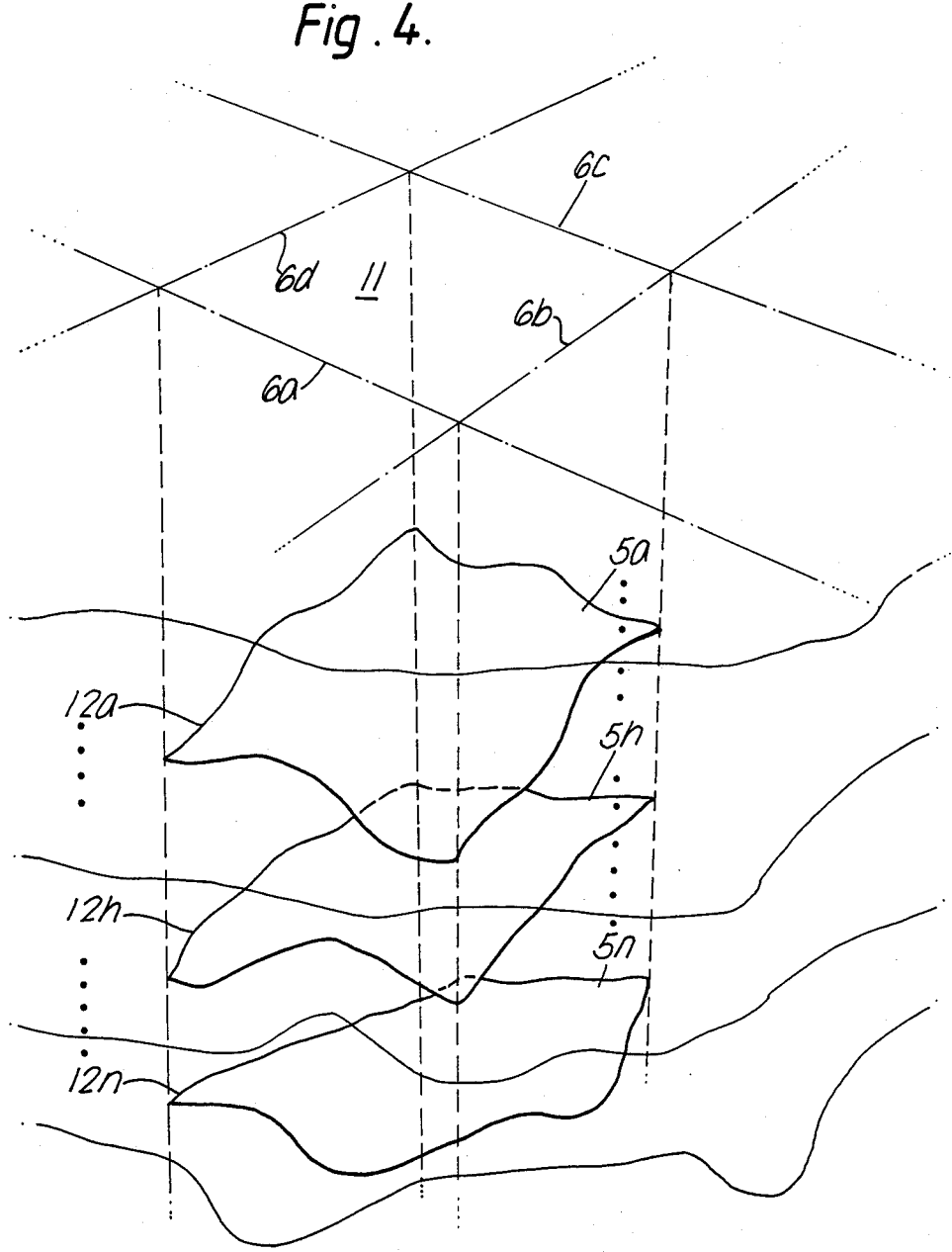
FIG. 4 is a perspective view illustrating the vertical plane sections indicated in FIG. 3, composed to a volume section, the plane sections of FIG. 3 circumscribing a selected area for which further data is to be provided or treated.

In FIG. 4 there is perspectively illustrated how the transformation from a plane section in FIG. 3 to a volume section is made, the various echo lines 12a, 12b, . . . 12n in FIG. 3 circumscribing the area 11 which is to be further mapped and which comprises fractions of the geological layers 5a, 5b, . . . 5n.

Figure 5:
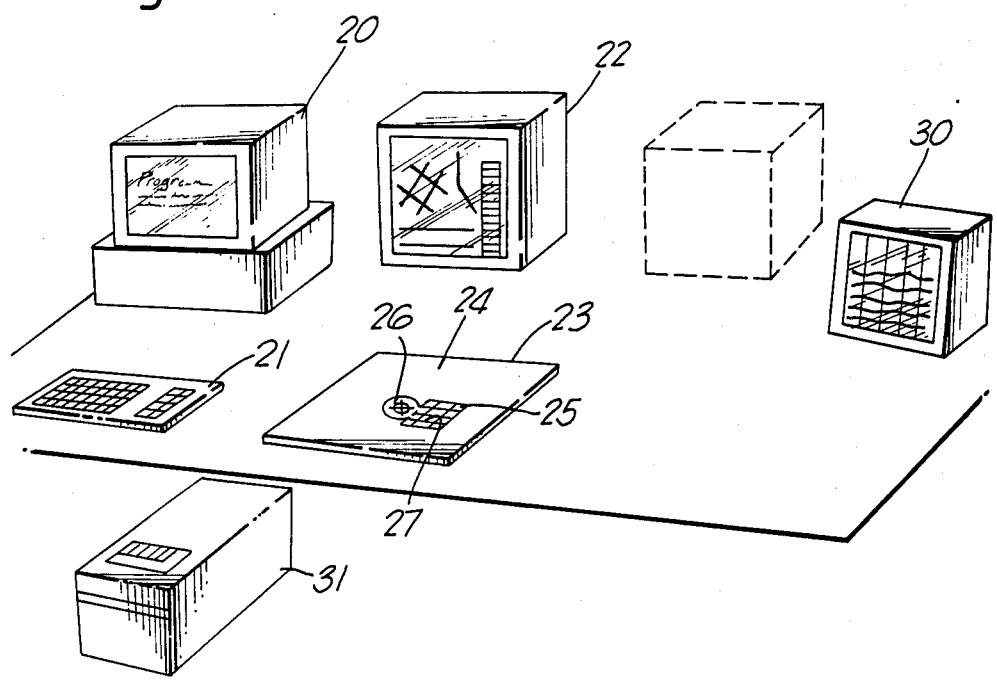
FIG. 5 illustrates diagrammatically an example of data processing units which can be used for the further treatment of echo line data.

In FIG. 5 there is diagrammatically illustrated an example of data processing units which can be used in the further treatment of the seismic data for procuring map values for the various geological layers in the desired interpretation area.

Thus, FIG. 5 shows a control unit 20 with associated keyboard 21, but it is to be understood that the control unit 20 can be connected to a larger not illustrated data installation which comprises the pretreated seismic data.

Further, FIG. 5 illustrates a graphic screen 22 with an associated operator unit 23 comprising a sensor support 24 as well as a sensor unit or cursor guide 25 which in turn comprises a cursor guide area 26 and an operator keyboard 27.

In FIG. 5 there is also illustrated a further screen 30 which displays the plan view indicated in FIG. 3, as well as a printer 31 for printout of finished treated data as maps.

Figure 6:
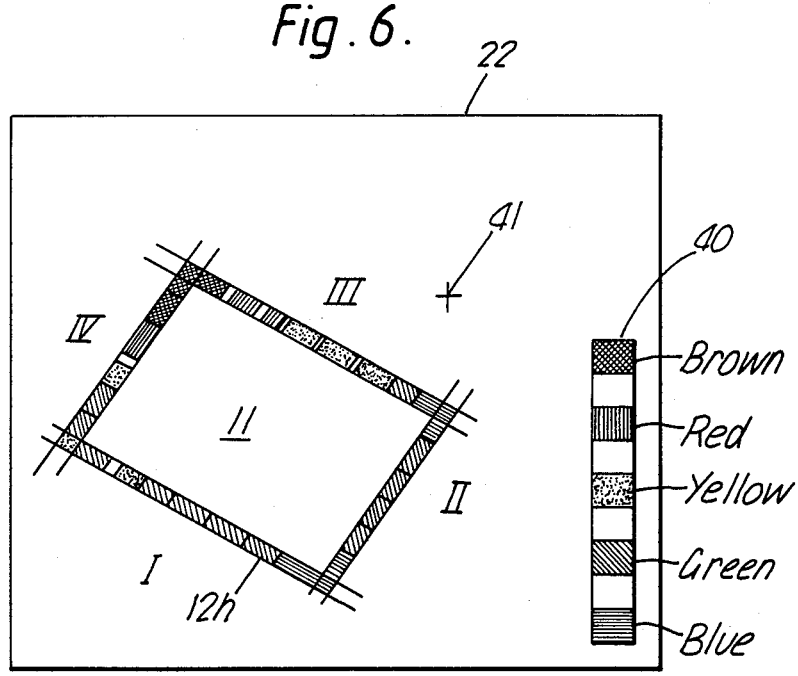
FIG. 6 illustrates simplified and diagrammatically on a larger scale how a fraction of the heading lines or grid lines which form the basis of the further treatment of echo values for the various geological layers below the sea bed, has been plotted by means of color codes corresponding to the various depth values, the grid here being presented on a graphic screen.

In FIG. 6 there is on a larger scale illustrated the graphic screen 22, the input thereto being a fraction of the heading lines or grid lines which are to constitute the basis for the interactive manual contouring program according to the invention. Thus, the grid or the volume section of the illustrated geological layer, for example the echo line 12h in FIG. 3, is inputted to the screen 22 with a color code, the transfer of the echo line depth values taking place automatically from the screen 30 to the screen 22 through the control unit 20 and the command keyboard 21.

To the right on the screen 22 in FIG. 6, there is illustrated a color scale 40 which can comprise a plurality of color values, whereas five main colors are illustrated here for the sake of simplicity, i.e. brown, red, yellow, green and blue, corresponding approximately to the level indications of an ordinary geographic map.

Thus, for a certain geological layer, for example the layer having the echo line 12h in FIG. 3, there are on the screen 22 indicated interpretation values as well as reference values by means of a color code, and the operator can then by means of the cursor guide 25 select a color code from the scale 40, the cursor 41 then flashing at the points along the echo line 12h having the same value as the selected color code.

With this starting point the interpreter can then between the sections of the echo line having the same color value, i.e. same depth value, draw contours or elevations as fresh interpreted values, which thereby can be put directly into the interpretation area 11, according to the same color code.

Figure 7:
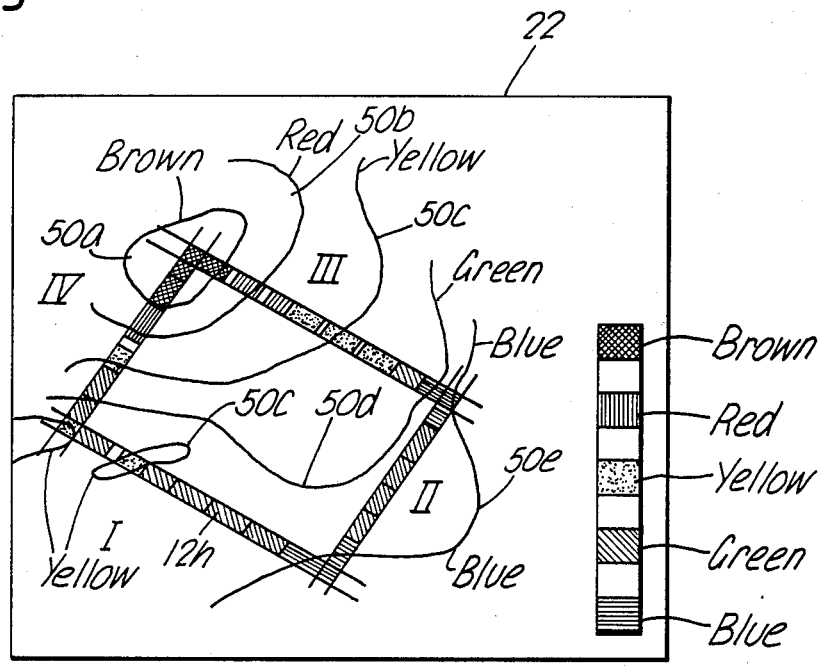
FIG. 7 is a view similar to FIG. 6, in which the interpreter for a selected structural layer has included contour lines or elevations between points having corresponding levels on the reference heading lines.

Thus, the operator can, as it appears from FIG. 7, accomplish an interactive manual contouring, i.e. all the time maintain an uninterrupted dialogue between himself and the machine while the contours are interpreted thereinto.

In FIG. 7 the interpreter has for a selected structural layer or echo line depicted elevations between points having corresponding level on the reference heading line, here echo line 12h.

Between the points, which on the echo line 12h are found on a higher level and which in the illustrated exemplified color scale is represented by the color BROWN, the interpreter can draw a contour line 50a. Correspondingly, the interpreter will between points which are on a second highest level, here represented by the color RED, draw a contour line 50b, and for an intermediate level which is marked with YELLOW color indication on the echo line 12h, one or more contour lines 50c can be interpreted thereinto.

In FIG. 7 there are also illustrated contour lines 50d and 50e which indicate the elevations represented by the colors GREEN and BLUE, respectively. Thus, between selected elevation values on the echo line, the interpreter draws fresh interpreted values and these fresh interpreted values are directly inputted to the same grid pattern according to the same color code.

During the drawing of the contour lines, it is appropriate to use either flashing fields or fields having a color different from the value color.

The indication of points having the same color value 50a–50e is initiated by means of a cursor 41 when this is present on one of the fields of the color coded echo line 12h, or on a preselected value of a separate value scale 40 on the graphic screen 22.

After the individual lines 50a–50e have been drawn with a neutral color, they can be influenced to assume the same value as the corresponding contour level.

Figure 8:
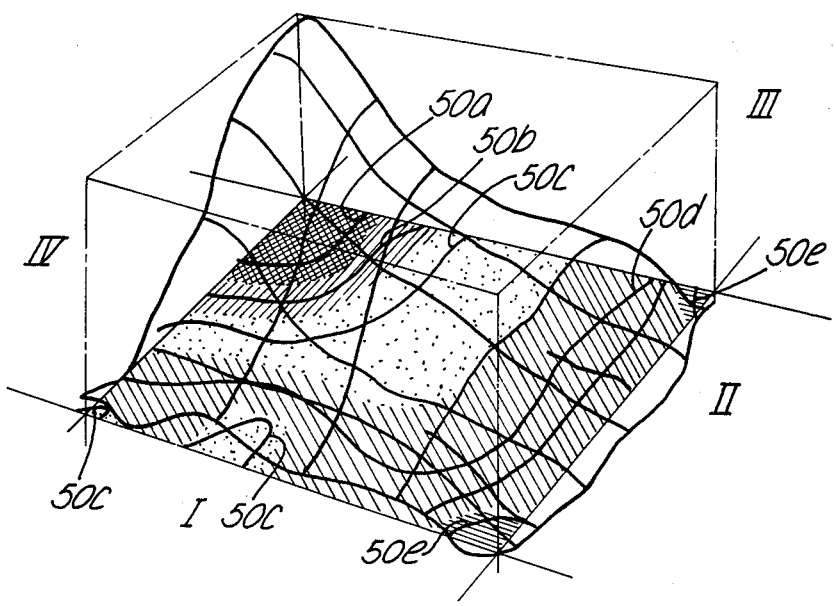
FIG. 8 is a perspective view of a three-dimensional representation of the map shown in FIG. 7, the map indicating the contour variations of a selected geological layer.

By further treatment of the screen picture in FIG. 7 after this has been provided with contours lines 50a–50c, one can provide a three-dimensional display of this plane map, for example of the type illustrated in FIG. 8.

Thus, in FIG. 8 there has been procured a color map for the selected geological layer, and it is possible on the basis thereof to visualize a picture of the geological deposits in this layer area.

Figure 9:
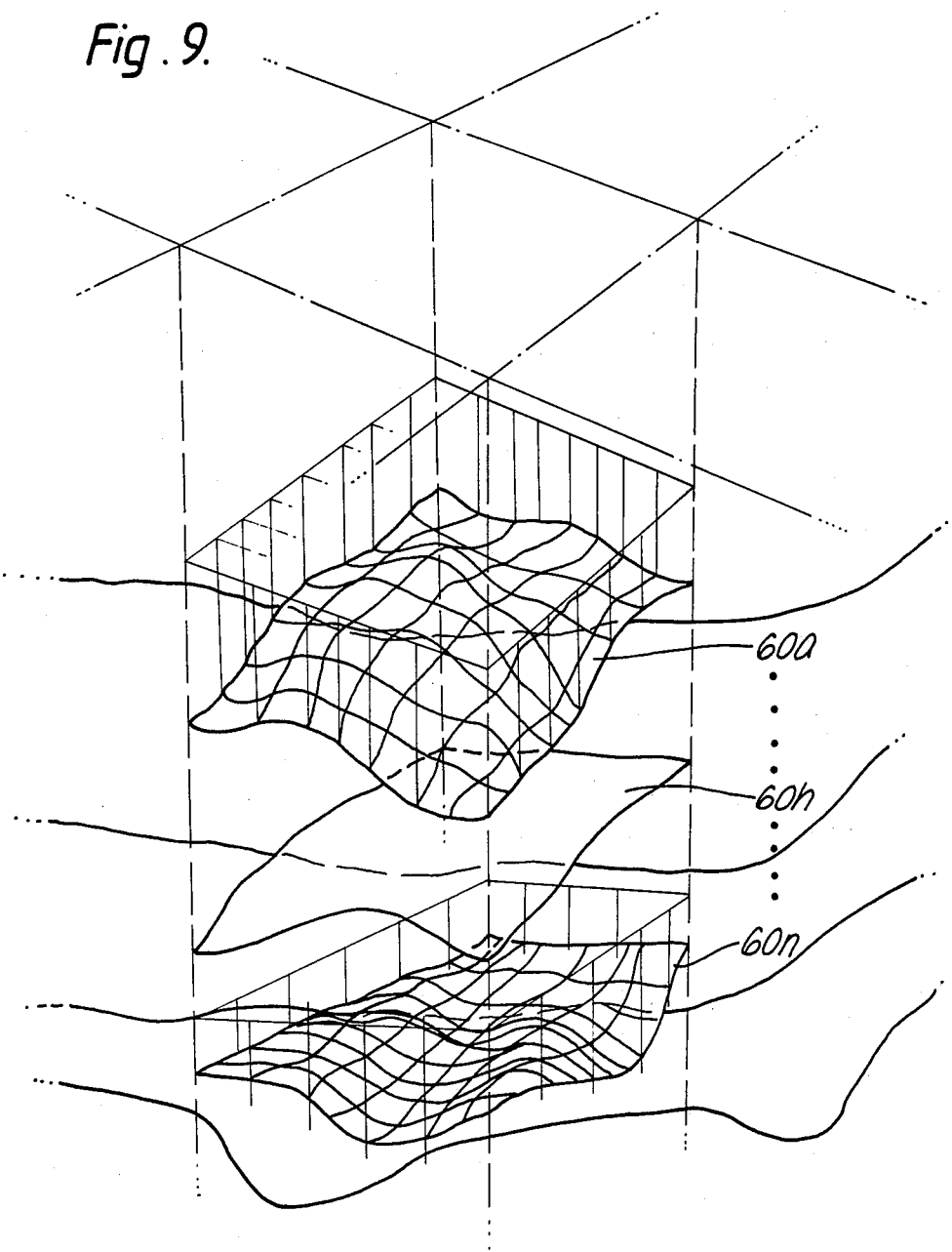
FIG. 9 is a sketch similar to FIG. 4, but wherein the individual structural layers have been provided with depth or map information between the volume limiting plane sections.

In FIG. 9 there is perspectively illustrated a plurality of finished calculated seismic maps 60a, . . . 60n for the various geological layers, for example those corresponding to the layers 5a, 5h and 5n in FIG. 4, respectively the echo lines 12a, 12h and 12n in FIG. 3.

By means of the present invention there can be procured seismic maps within a relatively short time after the provision of the pretreated data giving the echo lines. For the procurement of seismic maps, there has previously been used known depth data which reflect the seismic strata, said data being included as numeric indications on maps of the type illustrated in FIG. 2, i.e. maps which are outside a computer. On the basis of these numeric values, the operator then had to carry out a series of manual operations before the values could be inputted to the data installation, possibly as color codes.

By means of the new technique a series of passive operations taking place before the machine can treat the data further are avoided, the numeric indications being replaced by color indications and the passive use of the previous maps being dispensed with.

Thus, there is used an interactive manual contouring program having color posted echo data as an outspring for the interpreter for the procurement of the seismic maps.

By the technique according to the invention, fault traces can also be drawn into the grid with a special value which is coded with an easily recognizable color.

In FIG. 3 there is in the plane section portion III illustrated faults at the two echo lines located above the echo line 12h, and by treating these echo lines for the procurement of the type of map illustrated in FIG. 8, there would here have appeared fault portions having a special color code, for example white.

The surface adaption takes place by simple interpolation between the closest control points. This technique also takes faults into account by interpolating or extrapolating all the way up to the faults without giving regard to the values or the control points above the faults.

We claim:

1. A method for interactive contouring of seismic data for producing a three-dimensional reproduction of various structural layers within an area defined by heading lines along which a seismic vessel is moving during seismic operations, comprising:

selecting seismic data representing a plurality of individual structural layers referred to a fixed reference line;

pre-selecting color values on a color scale to indicate various depths of said seismic data relative to said fixed reference line;

producing each of said individual structural layers on a graphic data screen as a separate color coded echo line, the depth along each echo line being indicated by said pre-selected colors;

inserting on the graphic data screen between various points on each echo line having the same color value interpreted contour lines indicating elevations to produce a mapping on said graphic data screen having surface adaptations given in various color values; and printing out on a color value printer the graphic display on said screen to produce a three-dimensional map.

2. A method as claimed in claim 1 and further comprising:

transferring the data on said echo lines which in treated form represent said plurality of structural layers below an area circumscribed by said heading lines interactively from a data terminal device to the graphic screen.

3. A method as claimed in claim 1 and further comprising:

indicating points on the graphic screen having the same color value by flashing fields.

4. A method as claimed in claim 2 and further comprising:

indicating points on the graphic screen having the same color value by flashing fields.

5. A method as claimed in claim 1 and further comprising:

indicating points on the graphic screen having the same color value by fields having a color different from said same color value.

6. A method as claimed in claim 2 and further comprising:

indicating points on the graphic screen having the same color value by fields having a color different from said same color value.

7. A method as claimed in claim 3 and further comprising:

initiating said indication of points having the same color value by a cursor when said same color value is on one of said color coded echo lines.

8. A method as claimed in claim 4 and further comprising:

initiating said indication of points having the same color value by a cursor when said same color value is on one of said color coded echo lines.

9. A method as claimed in claim 4 and further comprising:

initiating said indication of points having the same color value by a preselected value on a separate value scale on the graphic screen.

10. A method as claimed in claim 6 and further comprising:

initiating said indication of points having the same color value by a preselected value on a separate value scale on the graphic screen.

11. A method as claimed in claim 1 and further comprising:

marking discontinuous data for an echo line with a neutral color.

12. A method as claimed in claim 4 and further comprising:
marking discontinuous data for an echo line with a neutral color.

13. A method as claimed in claim 1 and further comprising:
marking discontinuous data for an echo line with a color value different from said preselected color value.

14. A method as claimed in claim 4 and further comprising:
marking discontinuous data for an echo line with a color value different from said preselected color value.

15. A method as claimed in claim 1 and further comprising:
marking said contour lines with a neutral color; and
subsequently marking said contour lines with a preselected color corresponding to the contour depth.

16. A method as claimed in claim 2 and further comprising:
marking said contour lines with a neutral color; and
subsequently marking said contour lines with a preselected color corresponding to the contour depth.

17. A method as claimed in claim 3 and further comprising:
marking said contour lines with a neutral color; and
subsequently marking said contour lines with a preselected color corresponding to the contour depth.

18. A method as claimed in claim 4 and further comprising:
marking said contour lines with a neutral color; and
subsequently marking said contour lines with a preselected color corresponding to the contour depth.

19. A method as claimed in claim 12 and further comprising:
marking said contour lines with a neutral color; and
subsequently marking said contour lines with a preselected color corresponding to the contour depth.

* * * * *